(12) United States Patent
Landler

(10) Patent No.: US 8,146,731 B2
(45) Date of Patent: Apr. 3, 2012

(54) TRANSPORT DEVICE FOR CONTAINERS AND BUFFER FACILITY

(75) Inventor: Bruno Landler, Neutraubling (DE)

(73) Assignee: Krones AG (DE)

( * ) Notice: Subject to any disclaimer, the term of this patent is extended or adjusted under 35 U.S.C. 154(b) by 0 days.

(21) Appl. No.: 12/871,600

(22) Filed: Aug. 30, 2010

(65) Prior Publication Data

US 2011/0048898 A1 Mar. 3, 2011

(30) Foreign Application Priority Data

Sep. 2, 2009 (DE) .................. 10 2009 039 697

(51) Int. Cl.
*B65G 17/32* (2006.01)
(52) U.S. Cl. ............ 198/377.07; 198/465.4; 198/867.05
(58) Field of Classification Search ............ 198/377.02, 198/377.07, 485.1, 465.4, 867.02, 867.03, 198/867.05, 803.3, 867.14, 678.1, 680
See application file for complete search history.

(56) References Cited

U.S. PATENT DOCUMENTS

| 2,731,127 | A | * | 1/1956 | Harrison | 198/468.6 |
| 2,888,131 | A | * | 5/1959 | Allen | 198/680 |
| 3,927,760 | A | * | 12/1975 | McCall | 198/687.1 |
| 4,266,656 | A | | 5/1981 | Richard | 198/655 |
| 4,441,878 | A | * | 4/1984 | Harry | 198/803.15 |
| 4,467,911 | A | | 8/1984 | Forshee | 198/648 |
| 4,533,038 | A | | 8/1985 | Richard | 198/646 |
| 2009/0014615 | A1 | | 1/2009 | Hausladen | 248/311.2 |

FOREIGN PATENT DOCUMENTS

| DE | 28 27 055 | 1/1979 |
| DE | 28 40 974 | 4/1979 |
| DE | 10 2009 031 340 | 3/2010 |

OTHER PUBLICATIONS

German Search Report, dated Sep. 2, 2009 (4 pgs).

* cited by examiner

*Primary Examiner* — James R Bidwell
(74) *Attorney, Agent, or Firm* — Hayes Soloway P.C.

(57) ABSTRACT

Apparatus for transporting containers with a transport device, which transports a multiplicity of holding devices for the containers individually along a pre-specified transport path. At least one of these holding devices comprises at least two holding elements for gripping the containers. The holding device can be rotated in relation to the transport device about a pre-specified common rotary axis.

30 Claims, 4 Drawing Sheets

TRANSPORT DEVICE FOR CONTAINERS AND BUFFER FACILITY

BACKGROUND OF THE INVENTION

The present invention relates to a transport device for containers. Various systems for handling containers are known from the prior art, such as for example filler devices, labeling machines, blowing machines, sterilisation apparatus and similar. These processing devices are normally linked together by transport devices such as transport stars or similar. If in such a plant a single unit fails, such as for example a filler unit, this can lead to the complete plant having to be shut down briefly. If for example containers are passing through a heating device for warming, the stoppage leads to the containers in the oven becoming unusable as they are heated either for too long or for too short a time and normally the heating time must be precisely matched to the containers.

US 2009/0014615 A1 discloses a method and a device for holding containers. A carrier is provided on which two different holding elements are arranged which can hold different containers. Thus two different container formats can be processed or transported in this plant.

SUMMARY OF THE INVENTION

The present invention is based on the object of creating a transport device which also offers a buffer facility for the containers. Furthermore a transport device is created which, depending on requirements, can also process different container formats.

An apparatus according to the invention for transporting containers has a transport device which transports a multiplicity of holding devices for the containers, preferably individually and in particularly preferably with a constant pitch, along a specified transport path. According to the invention at least one of these holding devices has at least two holding elements for gripping the containers, and the holding device or parts of this holding device are arranged rotatably in relation to the transport device about a pre-specified common rotary axis. In this way it is possible to rotate the individual holding elements in relation to the rotary axis and thus deliberately select which holding element shall receive a container.

This rotation brings preferably precisely one holding element into the position for receiving containers from other plants or delivering these. Therefore preferably, as a function of the rotary position of the holding device, always only precisely one holding element is able to receive and/or deliver containers. The present invention is intended in particular for the transfer of containers between several machines such as for example a blowing machine, a labeling machine or a filler.

Said rotary axis, about which the holding devices or parts of these holding devices are rotatably arranged, advantageously runs substantially parallel to a longitudinal direction of the containers transported.

Advantageously the device comprises or is formed as a transport chain for transporting the holding devices. Here it is possible for the holding devices to be connected together such that said transport chain is formed by the multiplicity of holding devices. It is proposed that the holding devices are guided on a chain with in particular a defined and particularly preferably a uniform pitch, wherein each of these chain elements can have several container receivers, in particular between two and five container receivers, and in particular between two and four container receivers or holding elements.

Preferably the transport device can serve as a buffer device for the containers.

In an advantageous embodiment, at least two holding elements extend in different directions in relation to the rotary axis. Thus the two holding elements can for example point in different directions so that in operation two containers can be held and said rotary axis runs between these two containers.

In a further advantageous embodiment at least one holding element and preferably several and particularly preferably all holding elements are formed as passive holding elements. This means that said holding elements do not themselves engage in the containers but the containers are pushed onto and in particular into these.

In a further advantageous embodiment at least one holding device has a mechanical drive element by means of which the holding device can be rotated about the rotary axis. Thus for example a control element can be provided which can be turned, and the turning of the control element causes a rotation of the holding device or holding element. In addition however also electric drives can be provided to provoke this rotary movement of the holding devices.

In a further advantageous embodiment the device has a rotary element, in particular arranged stationary, which cooperates with the drive element of the holding device in order to turn the holding device about said rotary axis. Thus for example a switch cam can be provided which on relative movement of the drive element causes a turn of the holding device. This switch cam can for example be switchable so that on request at particular points or times a turn of the holding device is performed—in particular through a defined rotary angle—and not at other points or other times.

In a further preferred advantageous embodiment, at least one holding device has a roll device which rolls against a guide surface. Thus for example the individual chain links or holding devices can be equipped with two, for example also four, running rollers which are guided on two parallel tubes. Preferably the two tubes are guided in a horizontal direction.

At the ends of the drive device can be drive or guide wheels. These individual chain links or holding devices can be tensioned achieved via a tensioner at one of the guide or drive wheels.

In a further advantageous embodiment on at least one holding device, a screening device is arranged which at least partly covers the openings of the containers. In this embodiment the device is in particular suitable for transporting still open containers from one processing station to another processing station. The screening device, which can for example be a screening plate, can cover the orifices of the containers.

In a further advantageous embodiment the holding elements of at least one holding device are formed as one piece. In this one-piece embodiment in total the production costs for the holding devices can be reduced and the holding devices produced as a mass part.

Preferably the holding elements are made of a plastic, whereby the production costs can be lowered further.

In a further advantageous embodiment at least two holding elements of a holding device are formed differently. In this case the transport device can be set to two different container types and in this way facilitate a fitting change.

The present invention is furthermore directed at a plant for processing containers with an apparatus of the type described above. The plant has a first processing unit for processing containers and a second processing unit for processing containers, and the apparatus described above is arranged between these two processing units and thus transports the containers from the first processing unit to the second processing unit.

The present invention is furthermore directed at a holding device for holding containers, wherein the holding device can be arranged rotatably in relation to a pre-specified rotary axis and the holding device has at least two holding elements for gripping the containers, wherein these holding elements extend in different directions in relation to the rotary axis. Said holding device is suitable in particular for the apparatus according to the invention and allows the selective holding of one or more containers, so that this holding device in particular can serve as a buffer device between two processing plants.

Preferably said holding elements are designed as passive elements and particularly preferably the holding elements are made of a plastic.

The present invention is furthermore directed at a method for transporting containers wherein by means of a transport device, several holding devices are transported individually along a pre-specified closed transport path, and each holding device has several holding elements for holding the containers, wherein the holding elements can be rotated at least from time to time about a pre-specified rotary axis in relation to the transport device. This rotation of the holding elements allows a conversion of the transport device for example from a normal mode into a filling mode in which the device functions as a buffer.

Preferably at least from time to time at least one container is transported along the complete transport path. In this method the device functions as a buffer device in which several containers can be stored.

In a further advantageous method the containers are transported from a first processing device for processing containers via the transport device to a second processing device for processing containers.

BRIEF DESCRIPTION OF THE DRAWINGS

Further advantages and embodiments arise from the enclosed drawings.

These show.

DETAILED DESCRIPTION

Figure 1:
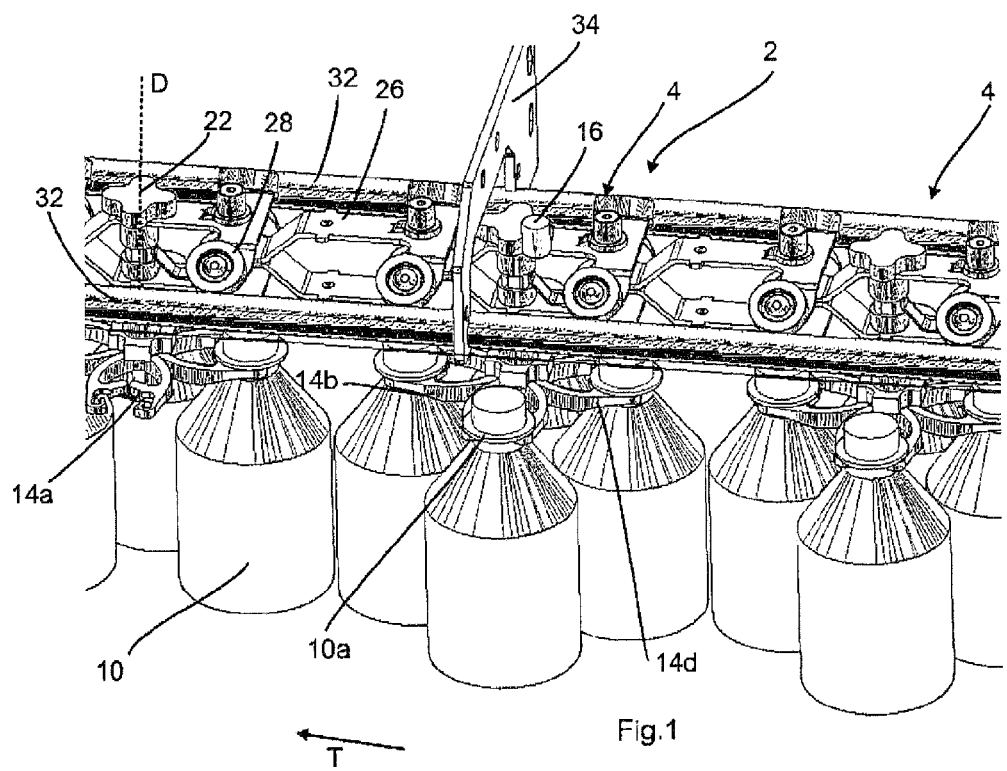
FIG. 1 a first partial view of a transport device according to the invention.

FIG. 1 shows a transport device 2 according to the invention as part of an apparatus, designated as a whole as 1, according to the invention for transporting containers. This transport device 2 has a multiplicity of holding devices 4 on each of which three or four containers 10 are arranged respectively. To this end the individual holding devices have holding elements 14a and 14b, 14c and 14d (14c not shown) which hold the containers 10 below their support ring 10b. However also holding elements such as holding mandrels could be provided which reach into the orifices 10c of the containers.

The individual holding elements 14a to 14d are here formed as one piece with each other and made of plastic. The individual holding devices 4 are transported by the transport device 2 along transport path T i.e. here from right to left. Reference numeral 26 identifies a chain link element via which the individual holding devices 4 are connected. Furthermore roller devices 28 or wheels are provided which rest on rails 32. The holding devices 4 are conveyed along these rails 32, which are also part of the transport apparatus 1.

Reference numeral 22 identifies a mechanical drive element which can be turned and which is coupled with the individual holding elements 14a to 14d so that these too can be turned about a rotary axis D. The rails 32 are held at predetermined intervals via connecting elements 34.

Reference numeral 16 identifies a rotary element which provokes a turn of the individual drive elements 22. More precisely, when the drive elements 22 are moved along the transport path T, the drive elements 22 strike against with this rotary element 16 which leads to a rotation of the drive element 22 and hence also of the individual holding elements 14a to 14d. The rotary element 16 or switch cam can be engaged or disengaged as required, where in disengaged state there is no rotation of the drive element 22. More precisely the rotary element 16 provokes a rotation of the drive element through 90°. This also corresponds to the arrangement of the holding devices which can each hold a maximum of four containers i.e. have four holding elements 14a to 14d.

Figure 2:
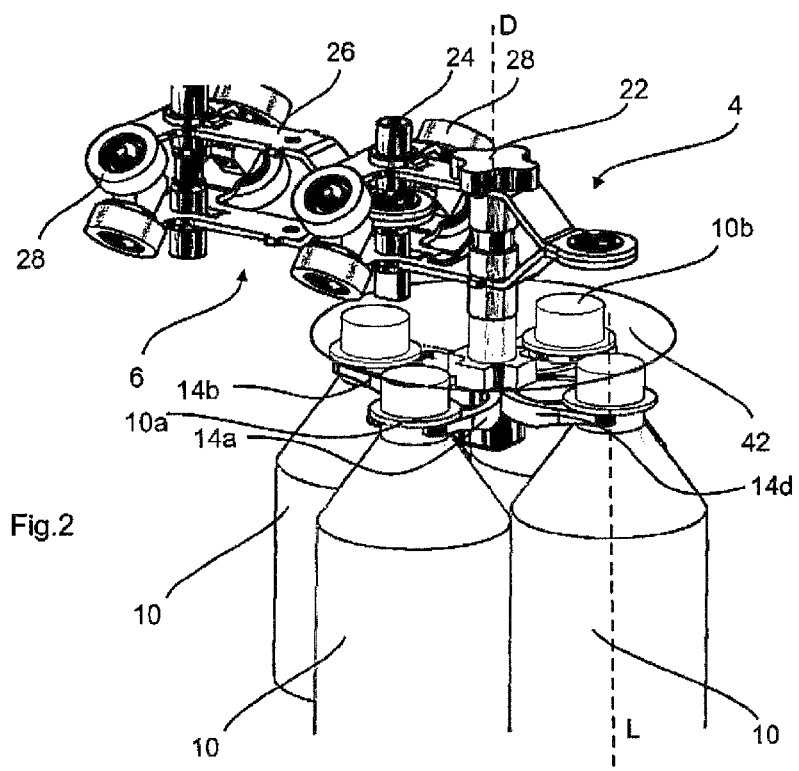
FIG. 2 a detailed view of the transport device shown in FIG. 1.

FIG. 2 shows a detailed view of a holding device 4. Here again can be seen the four holding elements 14a to 14d which—as stated above—are designed as plastic clamps. These can be turned about rotary axis D by means of drive element 22. Also shown are the individual chain links 26, which are each linked together (pivoting) via connecting shafts 24 so that in total they form the transport chain marked with reference numeral 6.

Rotary axis D is substantially parallel to a longitudinal direction L of the containers. Substantially parallel here means that an angle between the direction of rotary axis D and the longitudinal direction is less than 15°, preferably less than 10° and particularly preferably less than 5°.

Reference numeral 42 identifies a cover device such as a cover plate which covers the orifices 10c of the containers 10. This cover device 42 can be arranged stationary or can turn with the holding elements.

Figure 3:
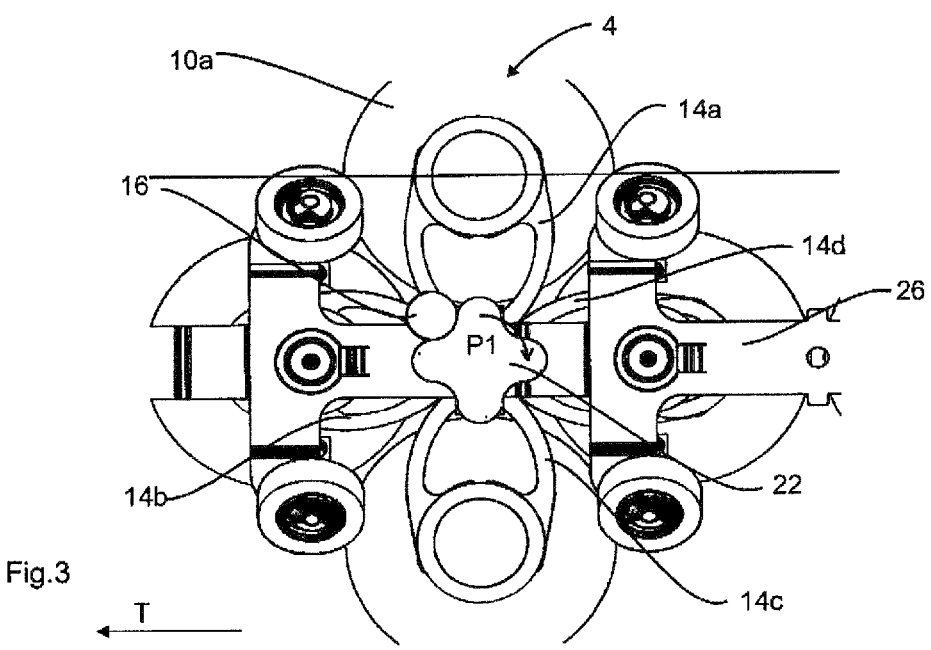
FIG. 3 a top view of a holding device.

FIG. 3 shows a top view of a holding device 4. Here again can be seen the rotary element 16 which, on movement of the holding device along transport path T, provokes a clockwise rotation of drive element 22 i.e. along arrow P1. The four individual holding elements extend at an angle of 90° to each other in relation to rotary axis D. The drive element 22—as stated—is coupled with the individual holding elements 14a to 14d and in particular is formed as one piece.

Figure 4:
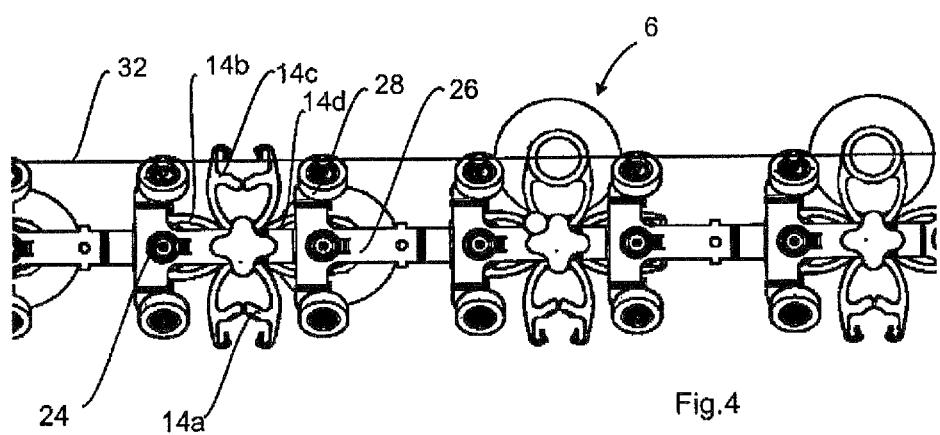
FIG. 4 a top view of the transport device in FIG. 1.

FIG. 4 shows a further depiction of a transport chain according to the invention i.e. here four holding devices 4 are shown which are each linked together (pivoting) via the said chain links 26 and are each guided at roller devices. In the embodiment shown here the chain links are each fitted with four running rollers and are guided on two parallel, horizontal rails 32. The diameter of these rails or tubes is preferably in the range between 10 mm and 14 mm, preferably in the range between 15 mm and 25 mm.

Thus the roller devices here are provided both above and below the rails 32. The chain is tensioned via a tensioner (not shown). The drive element or cam 22—as stated above—provokes a turn of 90° per pitch. The transport chain 6 can here be driven via a chain wheel (not shown), wherein other drive possibilities can be considered.

The transport chain 6 or individual holding elements 14a to 14d are loaded via so-called pitch changing stars, here for example an output star from the blowing machine or via decoupling stars for example in the case of an aseptic design. Other loading methods are possible depending on which machines surround the transport device. The continuous switching of the rotary element or cam 16 allows each chain element or each holding device 4 to hold up to four containers.

Figure 5:
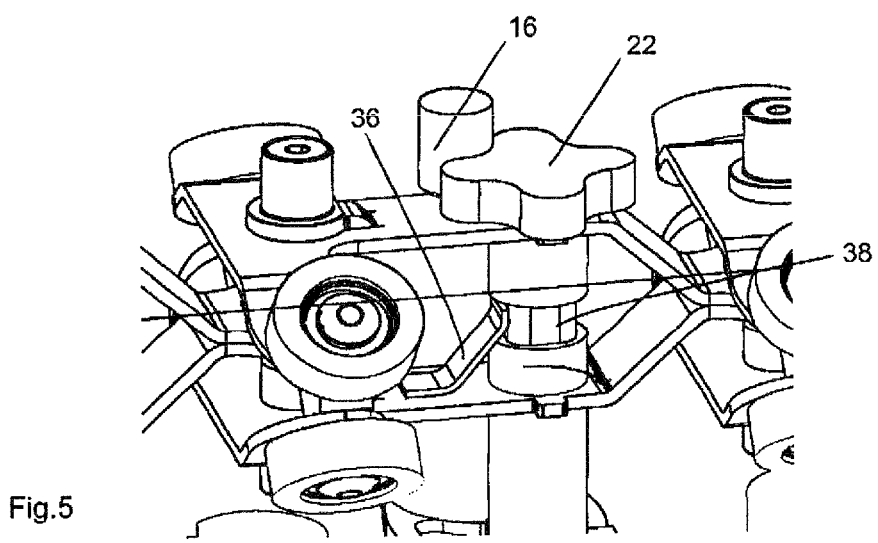
FIG. 5 a further detailed view of a transport device according to the invention.

FIG. 5 shows a further view of a transport device according to the invention. Here it is evident that the holding device has a square profile 38 on the camshaft, which profile is arranged inside the chain link. Furthermore a spring element 36 is provided which is pretensioned against the square profile on the camshaft. This spring element 36 allows correct positioning or engagement of the individual holding elements 14a to 14d. This spring element 36 also allows the chain clamps in engagement, in the case of a positioning fault e.g. an asynchronicity, to return to the input or output star in order to possibly fold away, and thus prevent further damage.

Figure 6A:
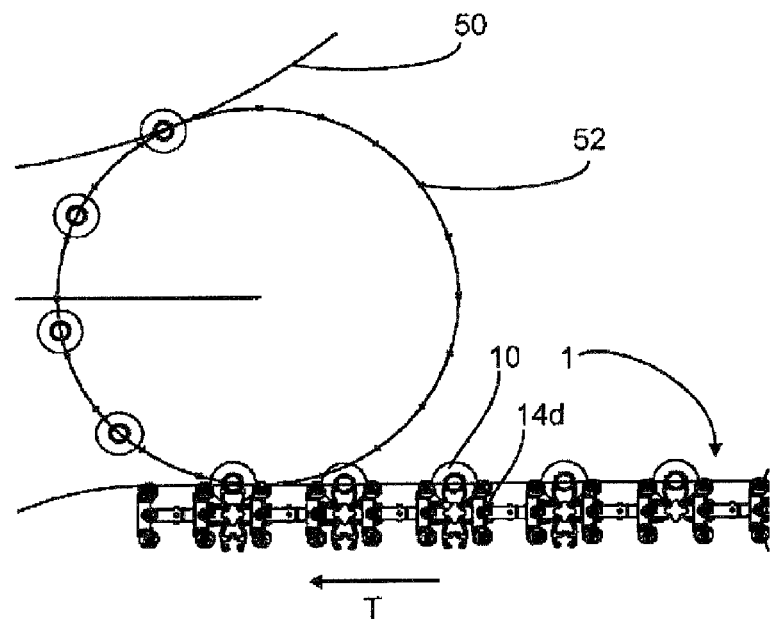
FIG. 6a-6d an illustration of applications of the transport device according to the invention.

FIGS. 6a to 6d illustrate four different applications of the transport device according to the invention. FIG. 6a shows a normal plant sequence in which the transport apparatus 1 is operated as a conventional transfer chain. In this case here only the outer holding element 14a is loaded with a container 10.

Figure 6B:
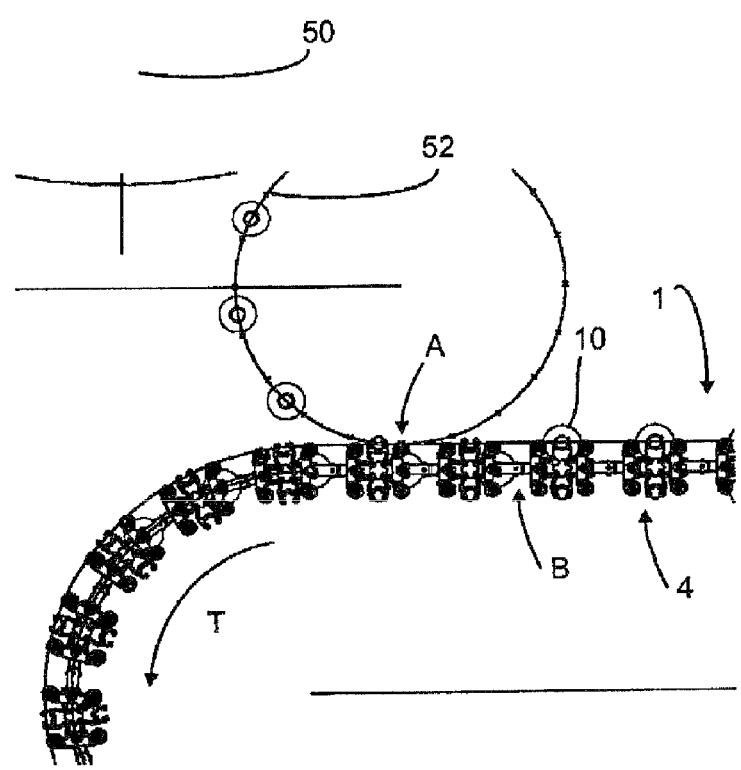

FIG. 6b shows a further operating state. In this state for example a following machine 50 fails and also a delivery star 52 has stopped at three to five machine pitches. The above-mentioned rotary element 16 or cam bolt can be connected shortly before the chain outlet A and rotates the chain fitting on through 90° each time to an empty clamp (area B). In this situation the container 10 is also swivelled by 90°. The now empty clamp 14d can now pass the stationary star 52 of the following machine 50. At the same time however further containers can be taken from a preceding machine. Transport device can in this way hold up to four bottles per chain link or holding device 4 from a blowing machine and thus evacuate the heating oven. At the same time an input block on a heating oven for preforms can be closed to preforms so that no new preforms can enter the heating device and hence also the blowing machine.

Figure 6C:
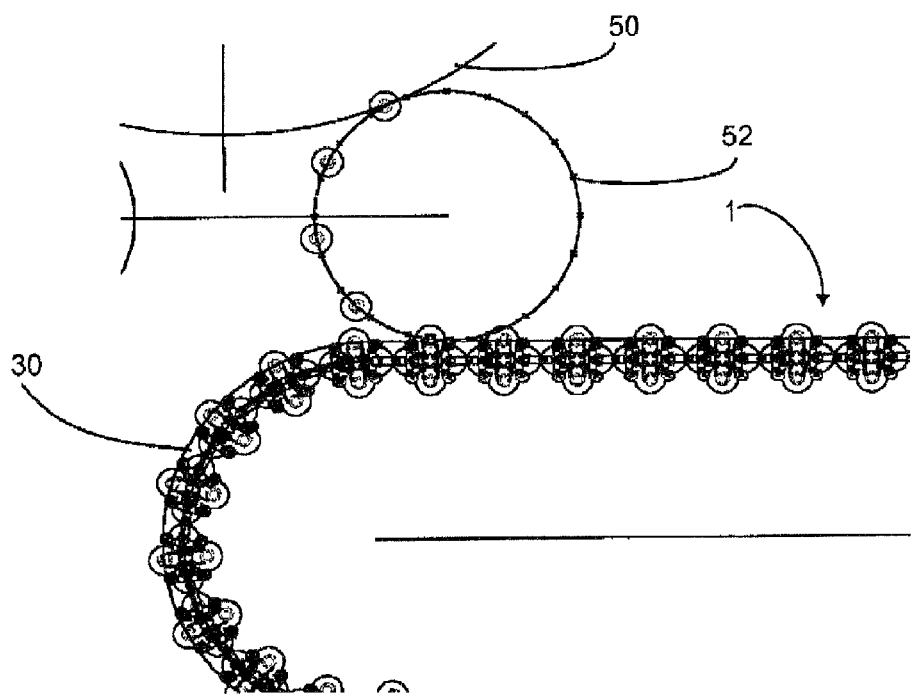

FIG. 6c identifies the corresponding operating state in which the transport apparatus 1 already picked up four containers.

Figure 6D:
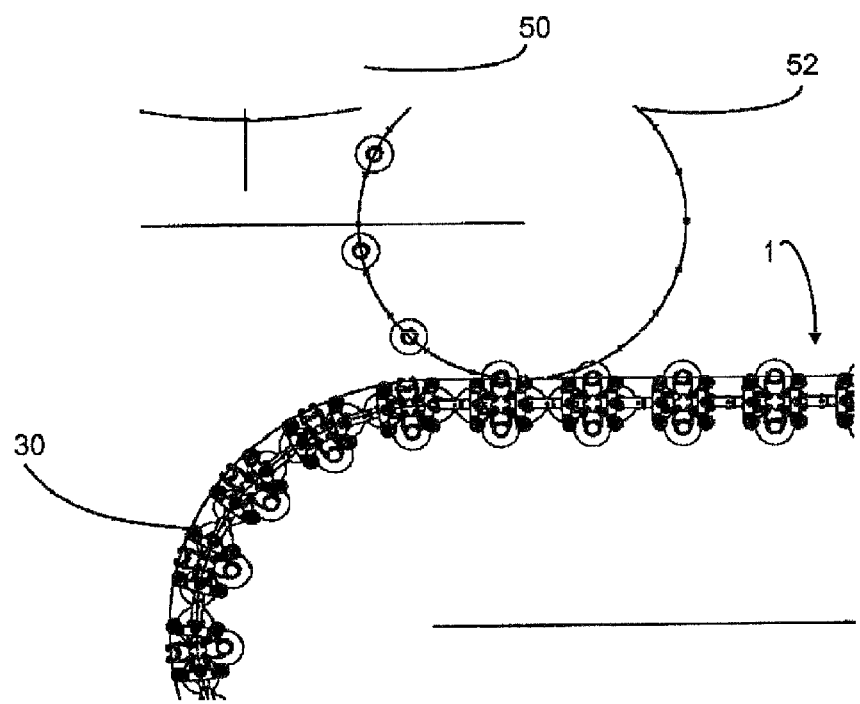

FIG. 6d shows a further situation in which the fault on the following machine 50 has been repaired. After all faults have been repaired, the further machine—here a filling device—evacuates all holding elements i.e. synchronisation takes place with the transport device 2. In this way a continuous switching of the cam 16 (the cam remains down and engages in each case in the recesses of the drive element) can be provoked so that each empty clamp is moved on by 90° to the next filled clamp until all holding devices are empty again. In this situation the preceding blowing machine (not shown) can again load the first chain after the first fully emptied chain link in order thus to prevent a gap in the container flow.

In a further application the transport device 2 according to the invention can also be used for base cooling. In this case it is possible to engage the cam 16 permanently i.e. always to provoke rotations. In this way each container passes through a loop of four circuits which can serve to cool the base of the containers, and only then are they passed via a transport star 52 to a further machine 50 such as a filler.

Furthermore the transport device according to the invention can also be introduced for gap processing such as before a labeling machine. Here it is possible for the chain to be filled with three bottles per chain link or holding device 4 at the start of the cycle. The fourth free clamp is used for conventional container transfer i.e. the cam is not switched. On loss of a bottle from the blowing machine, the resulting empty clamp is switched further using the cam and thus three times per chain link a gap-free container supply to the next labeling machine can be guaranteed. The transport device 1 or chain is thus gradually emptied and can then be refilled. If the number of chain links is selected to be different from for example the number of blowing stations on a preceding blowing module, it would also be possible to evacuate several chain links in a row in order thus to compensate failures of individual blowing stations for a longer period.

Furthermore it would also be possible to use the transport device according to the invention for automatic fitting change. Here each individual holding device or chain element can be fitted with up to four different clamp types, and in the event of a type change, switched to the corresponding fitting. Thus it would also be possible to have combined use of the transport device, in which for example each holding device has two holding elements of different types.

The transport device according to the invention allows a high performance range and chain speeds of up to 3 metres per second. Furthermore the time for delivery can be reduced in comparison with a star block with base cooling. In particular the use of passive clamps allows a cost reduction. In addition a compact construction is possible due to multiple loading of the chains.

In particular due to the use of the switchable cam 16 for the entire system, simple control of the transport device is possible. The return of the transport device can also be fully utilised. Furthermore by use of a switch cam, a rapid response time is possible as cam switching can be performed even at high power. Also—as stated above—an automatic fitting change in transfer is possible.

All features disclosed in the application documents are claimed as essential to the invention where novel individually or in combination in relation to the prior art.

REFERENCE NUMERAL LIST

1 Apparatus for transporting containers
2 Transport device
4 Holding device
10 Container
10a Support ring
10b Orifice
14a-14d Holding element
16 Rotary element, switch cam
24 Connecting shaft
22 Drive element
26 Chain link element
28 Roll device
32 Rails
34 Connecting elements
36 Spring element
38 Square profile
50 Following machine
52 Delivery star
T Transport path
D Rotary axis
A, B Areas
L Longitudinal direction of containers

The invention claimed is:

1. An apparatus for transporting containers, with a transport device which transports a multiplicity of holding devices for the containers individually along a pre-specified transport path (P), wherein at least one of these holding devices has two holding elements for gripping the containers and the holding device can be rotated in relation to the transport device about a pre-specified common rotary axis (D), and wherein the apparatus has a transport chain for transporting the holder devices.

2. The apparatus according to claim 1, wherein at least two holding elements extend in different directions in relation to the rotary axis (D).

3. The apparatus according to claim 2, wherein the rotary axis (D) is substantially parallel to a longitudinal axis (L) of the containers transported.

4. The apparatus according to claim 1, wherein at least one holding element is a passive holding element.

5. The apparatus according to claim 1, wherein at least one holding device comprises a mechanical drive element for rotating the holding device about the rotary axis (D).

6. The apparatus according to claim 5, wherein the apparatus has at least one stationarily arranged rotary element which cooperates with the drive element of the holding device to rotate this about the axis (D).

7. The apparatus according to claim 1, wherein at least one holding device has a roll device which rolls against a guide surface.

8. The apparatus according to claim 1, wherein arranged on at least one holding device is a screening device which at least partly covers openings of the containers.

9. The apparatus according to claim 1, wherein the holding elements of at least one holding device are formed of one piece.

10. The apparatus according to claim 1, wherein at least two holding elements of a holding device are structured differently.

11. A method for transporting containers, wherein a multiplicity of holding devices are transported individually by a transport device along a pre-specified closed transport path (T) and each holding device has several holding elements for holding the containers, wherein the holding elements are turned at least from time to time about a pre-specified rotary axis (D) in relation to the transport device, and wherein the holder devices are transported by a transport chain.

12. The method according to claim 11, wherein at least from time to time, at least one container is transported along the complete transport path.

13. The method according to claim 11, wherein the containers are transported from a first processing device for processing containers via the transport device to a second processing device for processing containers.

14. An apparatus for transporting containers, with a transport device which transports a multiplicity of holding devices for the containers individually along a pre-specified transport path (P), wherein at least one of these holding devices has two holding elements for gripping the containers and the holding device can be rotated in relation to the transport device about a pre-specified common rotary axis (D), wherein arranged on at least one holding device is a screening device which at least partly covers openings of the containers.

15. The apparatus according to claim 14, wherein at least two holding elements extend in different directions in relation to the rotary axis (D).

16. The apparatus according to claim 15, wherein the rotary axis (D) is substantially parallel to a longitudinal axis (L) of the containers transported.

17. The apparatus according to claim 14, wherein at least one holding element is a passive holding element.

18. The apparatus according to claim 14, wherein at least one holding device comprises a mechanical drive element for rotating the holding device about the rotary axis (D).

19. The apparatus according to claim 18, wherein the apparatus has at least one stationarily arranged rotary element which cooperates with the drive element of the holding device to rotate this about the axis (D).

20. The apparatus according to claim 14, wherein at least one holding device has a roll device which rolls against a guide surface.

21. The apparatus according to claim 14, wherein the holding elements of at least one holding device are formed of one piece.

22. The apparatus according to claim 14, wherein at least two holding elements of a holding device are structured differently.

23. An apparatus for transporting containers, with a transport device which transports a multiplicity of holding devices for the containers individually along a pre-specified transport path (P), wherein at least one of these holding devices has two holding elements for gripping the containers and the holding device can be rotated in relation to the transport device about a pre-specified common rotary axis (D), wherein at least two holding elements of a holding device are structured differently.

24. The apparatus according to claim 23, wherein at least two holding elements extend in different directions in relation to the rotary axis (D).

25. The apparatus according to claim 24, wherein the rotary axis (D) is substantially parallel to a longitudinal axis (L) of the containers transported.

26. The apparatus according to claim 23, wherein at least one holding element is a passive holding element.

27. The apparatus according to claim 23, wherein at least one holding device comprises a mechanical drive element for rotating the holding device about the rotary axis (D).

28. The apparatus according to claim 27, wherein the apparatus has at least one stationarily arranged rotary element which cooperates with the drive element of the holding device to rotate this about the axis (D).

29. The apparatus according to claim 23, wherein at least one holding device has a roll device which rolls against a guide surface.

30. The apparatus according to claim 23, wherein the holding elements of at least one holding device are formed of one piece.

* * * * *